(12) United States Patent
Kawasaki et al.

(10) Patent No.: US 7,453,262 B2
(45) Date of Patent: Nov. 18, 2008

(54) ROTATIONAL SPEED DETECTION SENSOR

(75) Inventors: Koji Kawasaki, Kariya (JP); Masahiro Kimura, Chiryu (JP); Eiichiro Iwase, Toyoake (JP)

(73) Assignee: Aisin Seiki Kabushiki Kaisha, Kariya-shi (JP)

( * ) Notice: Subject to any disclaimer, the term of this patent is extended or adjusted under 35 U.S.C. 154(b) by 149 days.

(21) Appl. No.: 11/327,419

(22) Filed: Jan. 9, 2006

(65) Prior Publication Data
US 2006/0169059 A1    Aug. 3, 2006

(30) Foreign Application Priority Data
Jan. 28, 2005    (JP) .............................. 2005-022160

(51) Int. Cl.
*G01P 3/44* (2006.01)
(52) U.S. Cl. ..................... 324/174; 324/207.25; 73/493
(58) Field of Classification Search ..............................
324/207.15–207.25, 173, 174; 384/448; 73/493
See application file for complete search history.

(56) References Cited

U.S. PATENT DOCUMENTS

| | | | |
|---|---|---|---|
| 6,590,776 B2 * | 7/2003 | Karino et al. ................ 361/728 |
| 6,781,367 B2 * | 8/2004 | Sakanoue ................ 324/207.2 |
| 6,844,719 B2 * | 1/2005 | Tsuge et al. ................ 324/174 |
| 7,116,095 B2 * | 10/2006 | Takizawa et al. ............ 324/174 |
| 2003/0001566 A1 | 1/2003 | Tsuge et al. |
| 2004/0080314 A1 * | 4/2004 | Tsujii et al. ............ 324/207.21 |
| 2004/0150390 A1 * | 8/2004 | Tsuge et al. ................ 324/174 |

FOREIGN PATENT DOCUMENTS

| | | |
|---|---|---|
| EP | 1 262 779 A2 | 5/2002 |
| EP | 1 262 779 A3 | 5/2002 |
| JP | 2000-206130 | 1/1999 |
| JP | 2003-014498 | 6/2001 |

OTHER PUBLICATIONS

European Search Report dated Jun. 1, 2006.

* cited by examiner

*Primary Examiner*—Jay M Patidar
(74) *Attorney, Agent, or Firm*—Reed Smith LLP; Stanley P. Fisher, Esq.; Juan Carlos A. Marquez, Esq.

(57) ABSTRACT

A rotational speed detecting sensor includes a detecting portion having a detecting member provided facing a magnetized portion to be detected, the detecting portion for detecting variations of a magnetic flux generated by a rotation of the portion to be detected, a fix portion for fixing the detecting member, the fix portion being formed by means of molding and a case, a first end of which is closed and a second end of which is opened. The case includes a housing portion recessed toward the first end of the case from an opening portion side of the case, the housing portion for housing the detecting member, and a positioning portion for restricting a movement of the case in a mold in a direction toward the opening portion side of the case from the first end of the case.

9 Claims, 6 Drawing Sheets

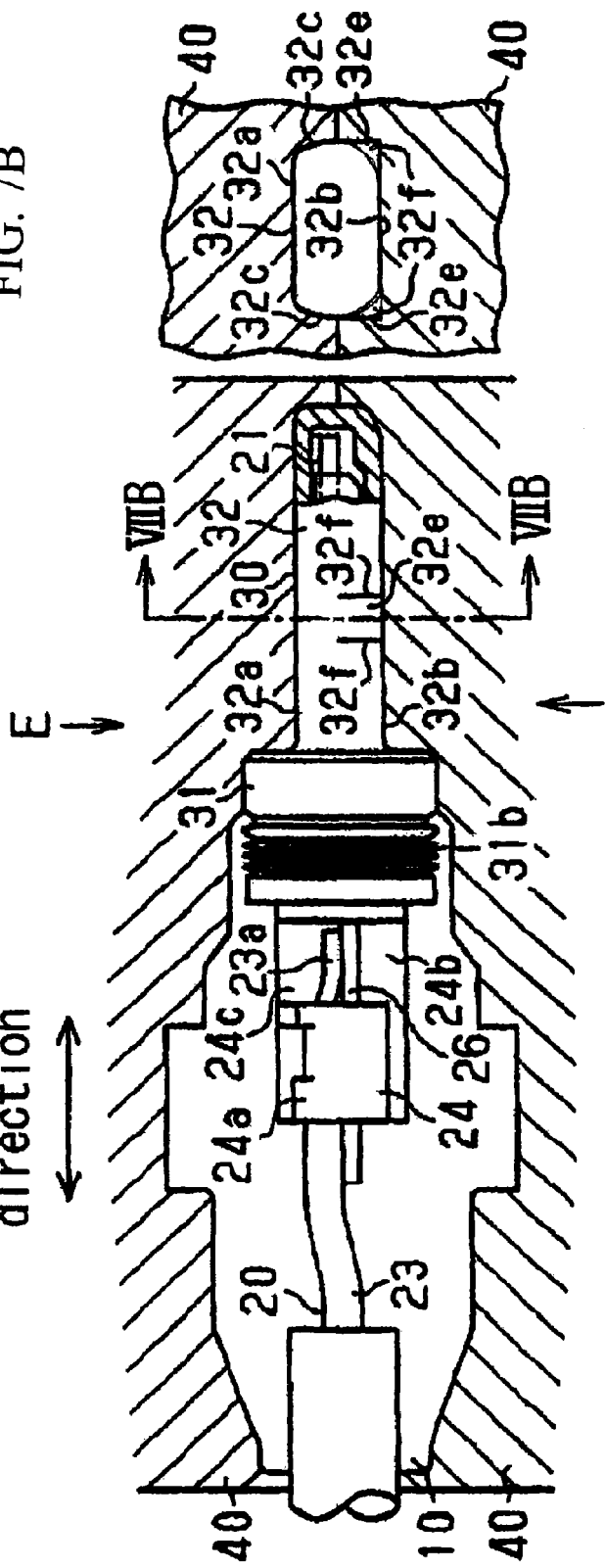

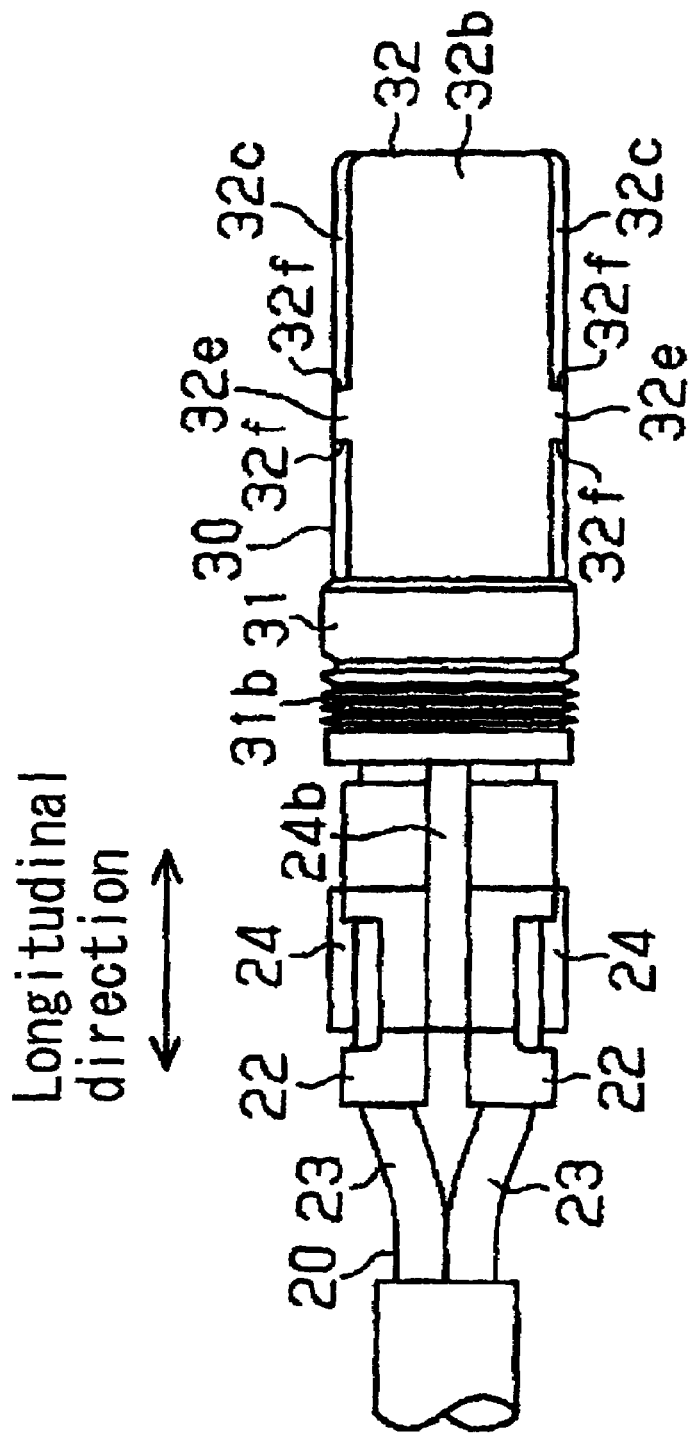

ROTATIONAL SPEED DETECTION SENSOR

This application is based on and claims priority under 35 U.S.C. § 119 to Japanese Patent Application 2005-022160, filed on Jan. 28, 2005, the entire content of which is incorporated herein by reference.

FIELD OF THE INVENTION

This invention relates to a rotational speed detecting sensor.

BACKGROUND

Conventionally, a rotational speed detecting sensor for detecting a vehicle speed, or the like, includes a detecting member, which is housed in a case made of resin, or the like, and fixed at a vehicle side by means of a fix portion. The detecting member is provided facing a portion to be detected, which is attached to an object to be detected such as an inner race of a bearing, or the like, and integrally rotatable with the object to be detected. The detecting member detects a rotational speed of a rotor by detecting amount of a magnetic flux, which is varied in response to a rotation of a magnetized portion to be detected. Therefore, with the configuration of such rotational speed detecting sensor, the detecting member might necessarily be positioned reliably within a guaranteed magnetic flux area, which is generated by means of the portion to be detected.

A known rotational speed detecting sensor configured as described above is disclosed in JP2003-014498A. The disclosed rotational speed detecting sensor includes a detecting portion, a case, and a fix portion. After the detecting portion is reliably fixed to the case, the case is formed with the fix portion for fixing the detecting portion to the vehicle by means of resin molding. Therefore, the detecting portion can be disposed in the vicinity of the portion to be detected without difficulty.

However, because the disclosed rotational speed detecting sensor forms the fix portion relative to the case, a positioning of the detecting member relative to the fix portion might be difficult. Further, a position of the case housed in a mold may occasionally be shifted caused by, for example, the resin supplied into the mold at the time of forming the fix portion, or a handling of a work at the time of a setting of the mold. Therefore, a positional relation of the fix portion and the detecting member might be unreliable, and even when the fix portion is reliably fixed to a vehicle body at a predetermined position, a relative position of the portion to be detected and the detecting member may occasionally be shifted. More particularly, the positioning of the detecting member of the disclosed rotational speed detecting sensor might be unreliable in a direction in which the rotational speed detecting sensor is protruded from the fix portion as a base member, (a radial direction of the rotor to which the portion to be detected is attached) and an optimal detecting sensitivity may on occasions fail to be obtained.

A need thus exists for a rotational speed detecting sensor which ensures a relative positioning of the detecting member and the portion to be detected in the radial direction of the rotor.

SUMMARY OF THE INVENTION

According to an aspect of the present invention, a rotational speed detecting sensor includes a detecting portion having a detecting member provided facing a magnetized portion to be detected, the detecting portion for detecting variations of a magnetic flux generated by a rotation of the portion to be detected, a fix portion for fixing the detecting member, the fix portion being formed by means of molding, and a case, a first end of which is closed and a second end of which is opened. The case includes a housing portion recessed toward the first end of the case from an opening portion side of the case, the housing portion for housing the detecting member in such a manner that the detecting portion is inserted therein, and a positioning portion for restricting a movement of the case in a mold, in which the fix portion is formed, in a direction toward the opening portion side of the case from the first end of the case.

According to another aspect of the present invention, a method for manufacturing a rotational speed detecting sensor, includes the steps of preparing a terminal having a positioning hole, attaching a detecting member at the terminal on the basis of the positioning hole, the detecting member being provided facing a magnetized portion to be detected for detecting variations of a magnetic flux generated by means of a rotation of the portion to be detected, forming a detecting portion having a holder and a positioning contact surface by forming with the terminal in a single member by means of resin molding after the detecting member is attached to the terminal, electrically connecting a wire with the terminal while holding the wire by means of the holder, preparing a case, a first end of which is closed and a second end of which is opened, having a housing portion recessed toward the first end of the case from an opening portion side of the case, and having a positioning portion for restricting a movement of the case in a direction toward the opening side of the case from the first end of the case, housing the detecting member by inserting the detecting portion into the housing portion of the case, and contacting the case with the positioning contact surface, and forming a fix portion covering the terminal by means of the resin molding after the positioning portion of the case is positioned in a mold.

BRIEF DESCRIPTION OF THE DRAWINGS

The foregoing and additional features and characteristics of the present invention will become more apparent from the following detailed description considered with reference to the accompanying drawings, wherein:

FIG. 7A is a plane view illustrating a part of the rotational speed detecting sensor.

FIG. 7B is a sectional view taken along line VIIB-VIIB of FIG. 7A.

FIG. 8 is a plane view illustrating a part of the rotational speed detecting sensor illustrated in FIG. 7A, viewed from a direction of arrow F.

DETAILED DESCRIPTION

An embodiment of the present invention will be explained hereinbelow with reference to the attached drawings. A rotational speed detecting sensor 1 according to the embodiment of the present invention detects rotational conditions of wheels by detecting variations of a magnetic flux generated by means of a rotor, which is attached to an axle 2 serving as an object to be detected and is integrally rotatable with the axle 2.

Figure 1:
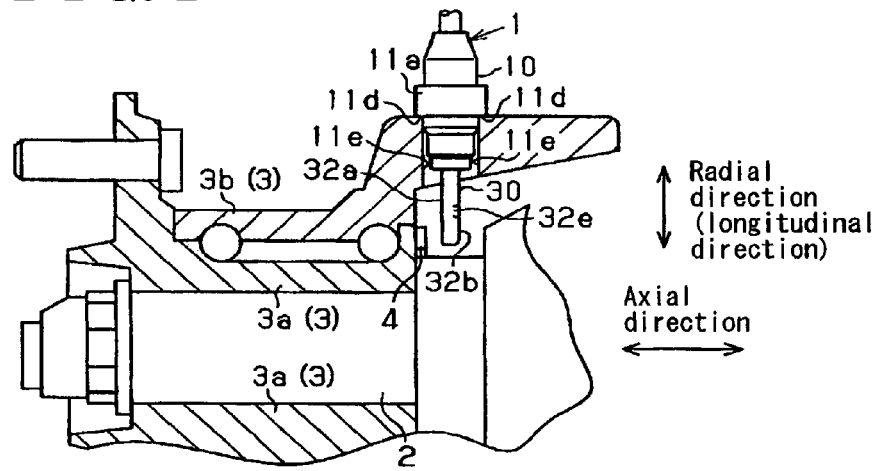
FIG. 1 is a schematic view of a rotational speed detecting sensor according to an embodiment of the present invention.

As illustrated in FIG. 1, the axle 2, which functions as the rotor, is rotatably supported by means of a bearing 3 relative to a vehicle. According to the embodiment of the present invention, a vertical direction of FIG. 1 corresponds to a radial direction of the axle 2 and a horizontal direction of FIG. 1 corresponds to an axial direction of the axle 2. A wheel (not shown) is fixed at a left end portion of the axle 2 shown in FIG. 1. The bearing 3 includes an inner race 3a integrally rotatable with the axle 2 and an outer race 3b fixed at the vehicle side. A ring shaped magnetized rotor 4 is coaxially provided with the axle 2 and magnetized to form alternately N and S poles thereon in a circumferential direction. The ring shaped magnetized rotor 4 is integrally rotatably fixed at both sides of an end portion of the inner race 3a in the axial direction. The rotational speed detecting sensor 1 is provided facing an end surface of the magnetized rotor 4, and detects the variations of the magnetic flux, which is generated by means of a rotation of the magnetized rotor 4 (i.e., a portion to be detected) together with the axle 2. Accordingly, the rotational speed detecting sensor 1 detects a rotational speed of the axle 2 representing a vehicle speed.

Figure 2A:
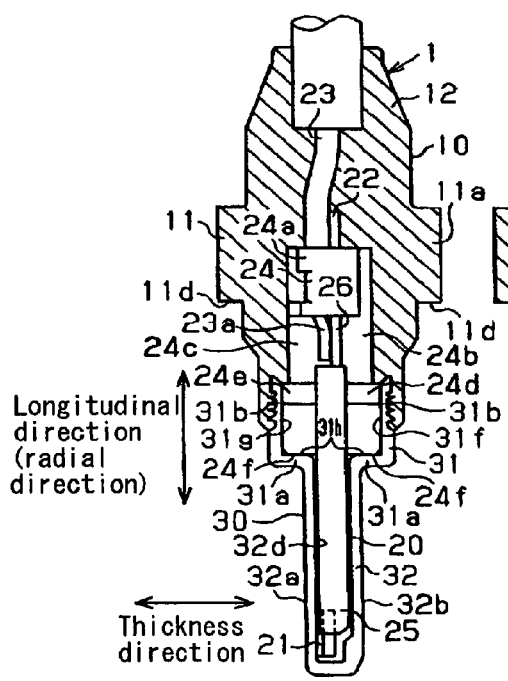
FIG. 2A is a partial sectional view of the rotational speed detecting sensor illustrated in FIG. 1, viewed from a direction facing the FIG. 1.
Figure 2B:
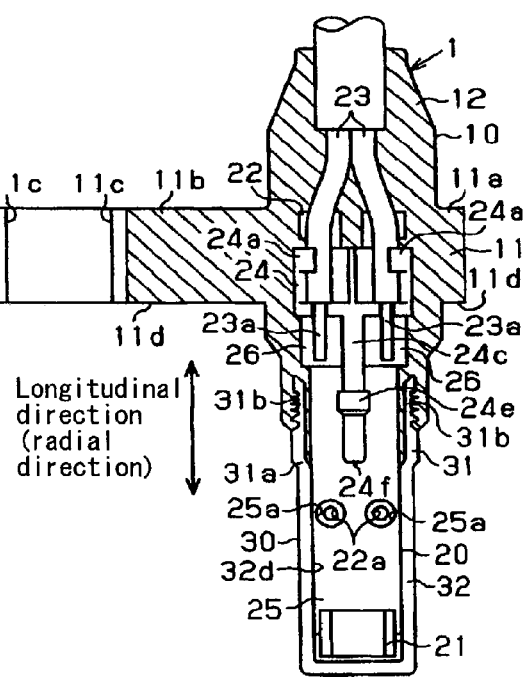
FIG. 2B is a partial sectional view of the rotational speed detecting sensor illustrated in FIG. 1, viewed from an axial direction of the axle.

As illustrated in FIGS. 2A-2B, the rotational speed detecting sensor 1 includes a detecting portion 20, a case 30 into which the detecting portion 20 is inserted, a fix portion 10, which covers the detecting portion 20 and is fixed at an outer race 3b (see FIG. 1). The detecting portion 20 is formed to extend in a substantially column shape, and a Hall IC 21 is attached at a tip of the detecting portion 20. The Hall IC 21 (i.e., a detecting member) outputs a signal in response to the variations of the magnetic flux generated by means of the rotation of the magnetized rotor 4. The detecting portion 20 is inserted into the case 30 so that the tip portion thereof, that is, at least the Hall IC 21, is housed in the case 30. Further, the detecting portion 20 is provided in such a manner to extend in the radial direction of the axle 2 by means of the fix portion 10. On this occasion, because the radial direction of the axle 2 corresponds to a longitudinal direction of the rotational speed detecting sensor 1 (a direction toward an opening portion side of the case 30), the radial direction of the axle 2 and the longitudinal direction of the rotational speed detecting sensor 1 will be explained as an identical direction in the following explanation.

As illustrated in FIGS. 2A-2B, the fix portion 10 of the rotational speed detecting sensor 1 includes a detecting portion cover portion 12 for covering a part of the detecting portion 20 and the case 30, and a fix support portion 11 fixed at the outer race 3b (see FIG. 1). The fix support portion 11 and the detecting portion cover portion 12 are formed into a single member by means of resin molding. The resin includes a plastic, or the like.

The fix support portion 11 includes a guard portion 11a and a bolt fix portion 11b. The guard portion 11a protrudes outwardly in a circumferential direction from an outer circumference of the detecting portion cover portion 12. The bolt fix portion 11b extends in one direction from the guard portion 11a as shown in FIG. 2B. The bolt fix portion 11b is formed with a through-hole 11c through which a fixing member (not shown) such as a bolt, or the like, is inserted for fixing the rotational speed detecting sensor 1 to the outer race 3b. The guard portion 11a and the bolt fix portion 11b include an outer race contact surface 11d for contacting with the outer race 3b. The fix support portion 11 is fixed to the outer race 3b in such a manner that the outer race contact surface 11d and the outer race 3b are contacted. The outer race 3b is formed with a mounting hole 11e (see FIG. 1) having an inner diameter, which is larger than an outer diameter of the detecting portion cover portion 12 to some degree. Further, the guard portion 11a has an outer diameter, which is larger than the inner diameter of the mounting hole 11e to some degree.

The fix support portion 11 is fixed to the outer race 3b by means of the bolt and the outer race contact surface 11d in such a manner that a movement of the fix portion 10 in the radial direction of the axle 2 (see FIG. 1) is restricted. Accordingly, the detecting portion 20 and the case 30 are reliably positioned and fixed relative to the vehicle.

The detecting portion 20 includes the Hall IC 21 (i.e., the detecting member), a terminal 22 to which the Hall IC 21 is electrically connected and fixed, and a holder 24 having a wire 23 transmitting the signal from the Hall IC 21.

The Hall IC 21 (see FIG. 2A) is attached at a first end portion of the terminal 22 in a longitudinal direction thereof and outputs the signal in response to the variations of the magnetic flux generated by means of the rotation of the magnetized rotor 4. As illustrated in FIG. 2B, the terminal 22 being a substantially plate shape is formed with two positioning holes 22a penetrating through in a thickness direction thereof. Further, the terminal 22 and the Hall IC 21 are integrally covered by means of a terminal cover portion 25. As illustrated in FIGS. 1-2A, the axial direction of the axle 2 corresponds to a thickness direction of the detecting portion 20.

As illustrated in FIG. 2B, the terminal cover portion 25 includes hole portions 25a coaxially formed with the positioning holes 22a. Each positioning hole 22a formed on the terminal 22 is exposed from the terminal cover portion 25 by means of the hole portion 25a. Thus, a position of the positioning hole 22a can be confirmed after the terminal cover portion 25 is formed. The Hall IC 21 is disposed at the magnetized rotor 4 side relative to a substantially axial center of the thickness direction of the terminal 22 (right side as viewed in FIG. 6A) so that the Hall IC 21 is positioned close to the magnetized rotor 4.

Figures 4A, 4B:
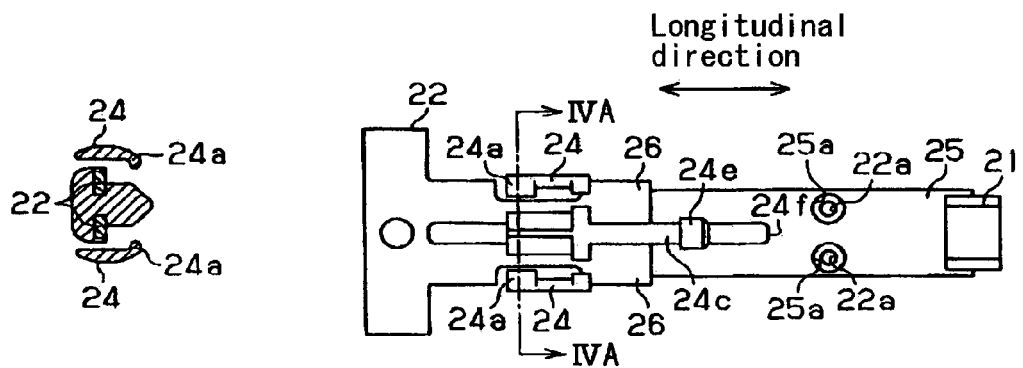
FIG. 4A is a sectional view taken along line IVA-IVA of FIG. 4B.
FIG. 4B is a plane view illustrating a part of the rotational speed detecting sensor.

As illustrated in FIG. 4A, the holder 24 is provided at another side against the first end portion of the terminal 22, and includes pawl portions 24a, which are protruded so as to face with each other, to form a snap-fit structure. The wire 23 is fixed at a snap-fit portion of the holder 24.

The detecting portion 20 is formed with a first connecting portion 24b at a non-detecting surface side (right side as viewed in FIG. 2A and left side as viewed in FIG. 6A) and the detecting portion 20 is formed with a second connecting portion 24c at a detecting surface side (left side as viewed in FIG. 2A and right side as viewed in FIG. 6A) in such a manner to sandwich the terminal 22 in the thickness direction thereof.

The first connecting portion 24b and the second connecting portion 24c are protruded outwardly in the thickness direction of the terminal 22 from the terminal cover portion 25. The holder 24, the terminal cover portion 25, the first connecting portion 24b, and the second connecting portion 24c are formed into a single member (i.e., a resin portion) by means of the resin molding. The resin includes the plastic or the like.

As illustrated in FIGS. 2A-2B, the first connecting portion 24b is formed with a first press-fit fix portion 24d and the second connecting portion 24c is formed with a second press-fit fix portion 24e. A width of the first press-fit fix portion 24d is wider than that of the first connecting portion 24b, and a width of the second press-fit fix portion 24e is wider than that of the second connecting portion 24c. Further, the width of the first press-fit fix portion 24d is different from that of the second press-fit fix portion 24e. The first connecting portion 24b and the second connecting portion 24c are formed with, at an end surface thereof in the longitudinal direction, positioning contact surfaces 24f, respectively, in such a manner that each positioning contact surface 24f is extended substantially perpendicular in the thickness direction of the terminal 22.

The detecting portion 20 is formed with a connecting portion 26 at a position between the holder 24 and the terminal cover portion 25 in the longitudinal direction of the detecting portion 20 in such a manner that the terminal 22 is exposed. The wire 23 is fixed by means of the snap-fit structure formed at the holder 24, and a core wire 23a of the wire 23 is electrically connected to the connecting portion 26 of the terminal 22 by means of welding, or the like. Therefore, the core wire 23a and the Hall IC 21 (i.e., the detecting member) are electrically connected with each other through the terminal 22, and the signal of the Hall IC 21 are transmitted by means of the wire 23.

The case 30 being substantially hollow shape includes a cylindrical portion 31 and a terminal housing portion 32. The cylindrical portion 31 being a substantially cylindrical shape in appearance and being a hollow shape includes an opening portion at a first side thereof. The terminal housing portion 32 is formed in a substantially rectangular parallelepiped shape extending in the longitudinal direction from a bottom portion 31a of the cylindrical portion 31.

Figures 6A, 6B:
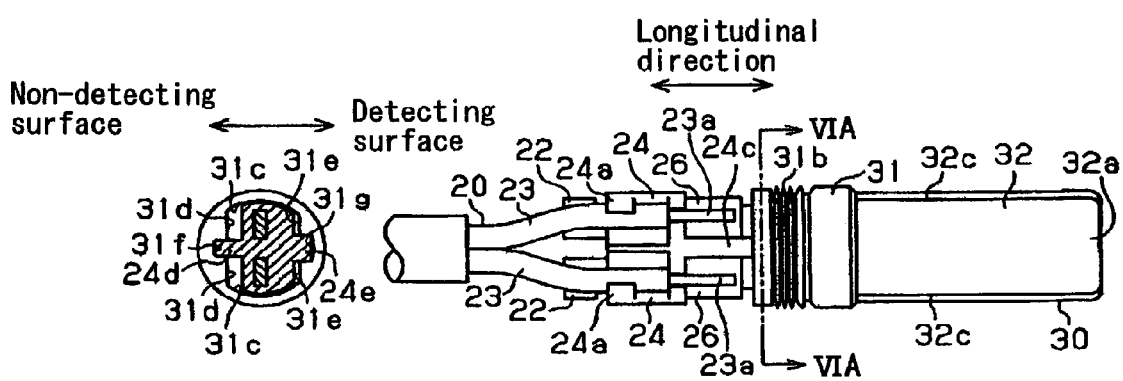
FIG. 6A is a sectional view taken along line VIA-VIA of FIG. 6B.
FIG. 6B is a plane view illustrating a part of the rotational speed detecting sensor illustrated in FIG. 7A, viewed from a direction of arrow E.

The cylindrical portion 31 is formed with, at an outer circumference of an opening portion side, plural ring shaped protrude portions 31b by forming plural grooves extending in a circumferential direction of the cylindrical portion 31. As illustrated in FIG. 6A, the cylindrical portion 31 includes, at an inner circumference thereof, a circular arc shaped inner circumferential circular arc surfaces 31c and planate shaped first and second surfaces 31d and 31e both of which are leading from the inner circumferential circular arc surfaces 31c in such a manner to face the detecting portion 20. The first surface 31d is provided at the non-detecting surface side and the second surface 31e is provided at the detecting surface side, and the first surface 31d and the second surface 31e are parallel with each other.

As illustrated in FIG. 2A, the first surface 31d is formed with a first guide groove 31f and the second surface 31e is formed with a second guide groove 31g, the first and second guide grooves 31f and 31g being extended toward an opening portion bottom surface 31h from the opening portion side of the cylindrical portion 31. A width of the first guide groove 31f is wider than that of the first connecting portion 24b and a width of the second guide groove 31g is wider than that of the second connecting portion 24c. Further, the first guide groove 31f is configured to have the width, which is narrower than that of the first press-fit fix portion 24d to some degree, so that the first press-fit fix portion 24d can be press-fitted into the first guide groove 31f, and the second guide groove 31g is configured to have the width, which is narrower than that of the second press-fit fix portion 24e to some degree, so that the second press-fit fix portion 24e can be press-fitted into the second guide groove 31g. Moreover, the width of the first press-fit fix portion 24d is different from that of the second press-fit fix portion 24e. Therefore, the second press-fit fix portion 24e cannot be press-fitted into the first guide groove 31f and the first press-fit fix portion 24d cannot be press-fitted into the second guide groove 31g.

As illustrated in FIG. 7B, the terminal housing portion 32 includes a detecting surface 32a facing the magnetized rotor 4, a back surface 32b parallel to the detecting surface 32a, and circular arc surfaces 32c having a diameter, which is smaller than that of the cylindrical portion 31 to some degree. On this occasion, an upper side of FIGS. 7A-7B corresponds to the detecting surface side and the bottom side of FIGS. 7A-7B corresponds to the non-detecting surface side.

Figure 9:
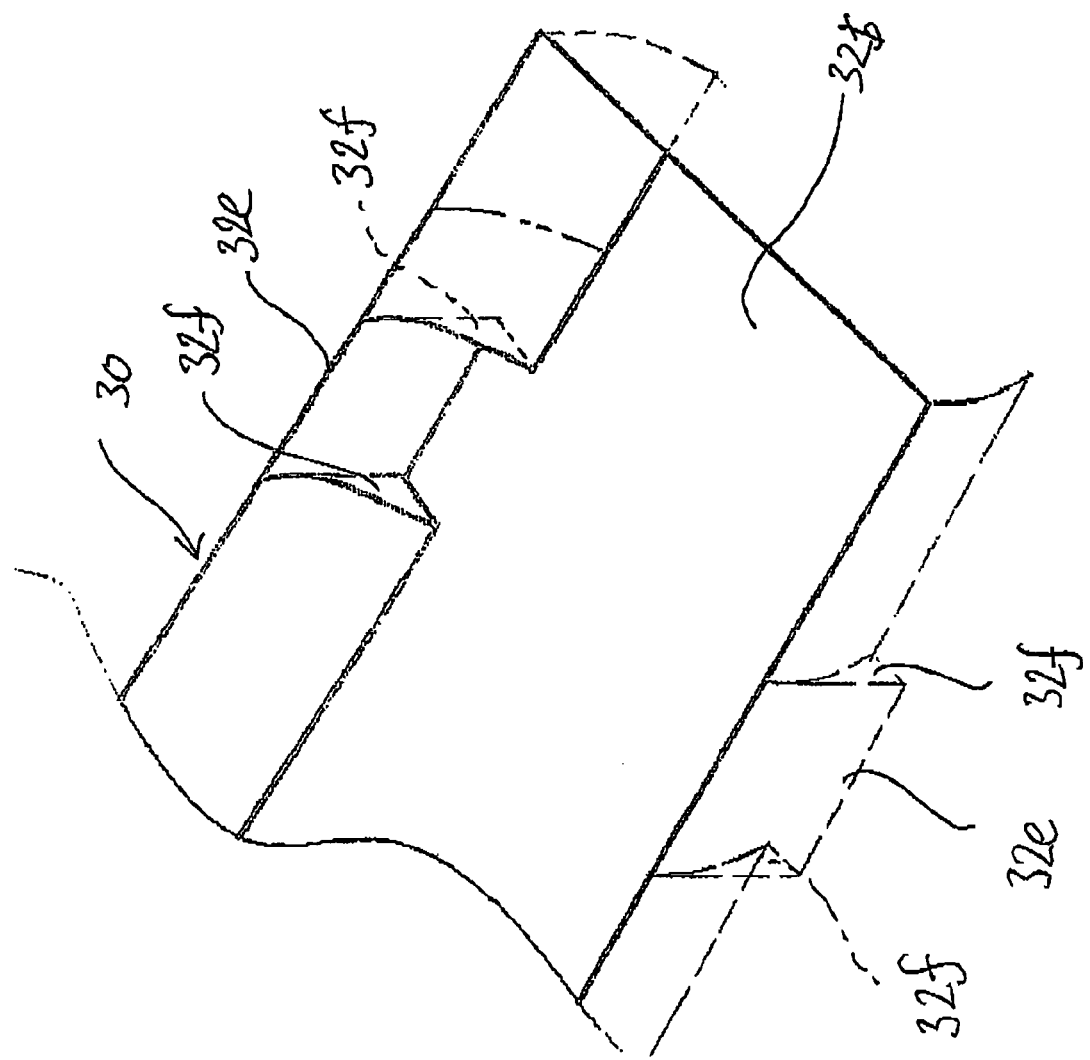
FIG. 9 is perspective view illustrating a terminal housing porting 32.

As illustrated in FIGS. 1, 7A-7B, and 8, a width of the back surface 32b is identical to a width of a circular arc forming the circular arc surface 32c. Positioning portions 32e are formed at the back surface 32b of the terminal housing portion 32. More specifically, end portions of the back surface 32b outwardly protrude from the circular arc surface 32c in a width direction, thus, form the positioning portions 32e continuously from the terminal housing portion 32. Furthermore, as best shown in FIGS. 7B, 8, and 9, mold contact surfaces 32f are respectively formed at longitudinal ends of each positioning portion 32e so as to protrude outwardly from the circular arc surface 32c. More particularly, each mold contact surface 32f extends outwardly from an outer circumferential surface of the case 30.

Further, as illustrated in FIGS. 2A-2B, a housing portion 32d is recessed at the terminal housing portion 32. The housing portion 32d, a shape of which is corresponding to the terminal cover portion 25, is extended from the opening portion bottom surface 31h. The terminal 22 is housed in the housing portion 32d and a rotation of the terminal 22 around an axis parallel to the longitudinal direction thereof is thereby restricted. The terminal 22 is housed in the terminal housing portion 32 in such a manner that the Hall IC 21 is disposed at the detecting surface 32a side.

With reference to FIGS. 3-8, a manufacturing process of the rotational speed detecting sensor 1 according to the embodiment of the present invention is explained. According to the embodiment of the present invention, a horizontal direction of FIGS. 3-8 corresponds to the longitudinal direction of the rotational speed detecting sensor 1, that is, the radial direction of the axle 2.

Figure 3:
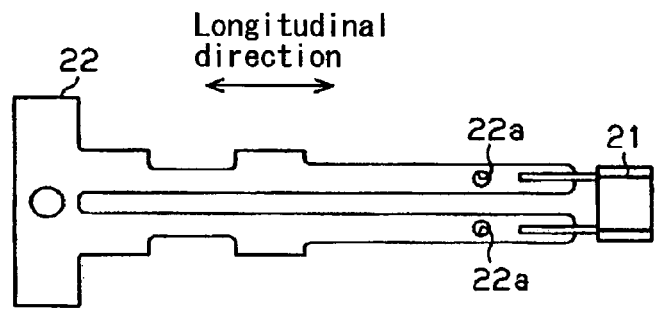
FIG. 3 is a plane view illustrating a part of the rotational speed detecting sensor.

First, as illustrated in FIG. 3, the Hall IC 21 is fixed to the terminal 22 on the basis of the positioning hole 22a formed at the terminal 22. Then, as illustrated in FIGS. 4A-4B, the holder 24, the first connecting portion 24b (see FIG. 2A), the second connecting portion 24c, and the terminal cover portion 25 are simultaneously formed into a single member with the terminal 22 by means of the resin molding. A mold used for the resin molding is formed with convex portions corresponding to each position of the positioning hole 22a. A position of the holder 24, the first connecting portion 24b, the second connecting portion 24c, and the terminal cover portion 25 relative to the terminal 22 is defined on the basis of the positioning hole 22a. At this time, the positioning contact surface 24f is formed by a predetermined distance away from the Hall IC 21.

Figures 5A, 5B:
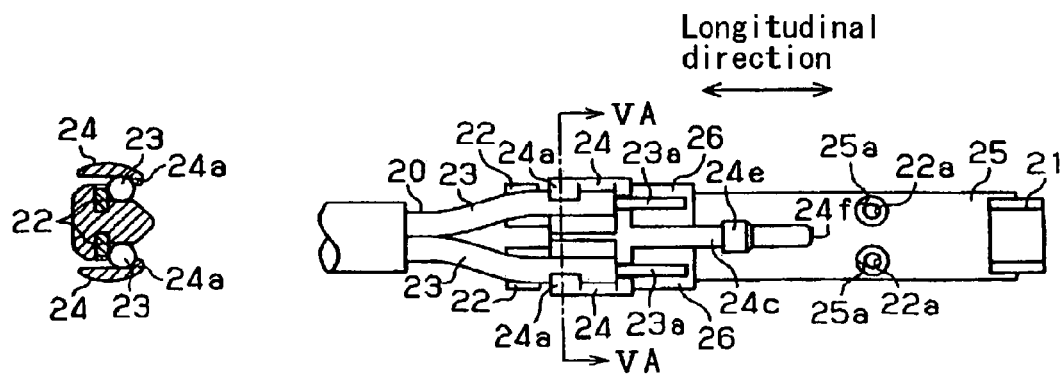
FIG. 5A is a sectional view taken along line VA-VA of FIG. 5B.
FIG. 5B is a plane view illustrating a part of the rotational speed detecting sensor.

Next, as illustrated in FIGS. 5A-5B, the wire 23 is latched by means of the pawl portions 24a of the holder 24 and fixed at the snap-fit portion of the holder 24. Then, the core wire 23a of the wire 23 is welded at the connecting portion 26 of the terminal 22, and thus the Hall IC 21 is electrically connected to the wire 23. In a condition where an external force is applied to the wire 23, because the wire 23 is fixed at the snap-fit portion of the holder 24, the external force applied to the wire 23 is not applied to the core wire 23a connected to the connecting portion 26. Accordingly, even when the external force is applied to the wire 23, the core wire 23a is not separated from the connecting portion 26.

Next, as illustrated in FIGS. 6A-6B, the detecting portion 20 is inserted into the case 30. On this occasion, the first press-fit fix portion 24d is press-fitted into the first guide groove 31f of the case 30, and the second press-fit fix portion 24e is press-fitted into the second guide groove 31g of the case 30, and the detecting portion 20 and the case 30 are thereby fixed as illustrated in FIGS. 2A-2B. Then, as illustrated in FIG. 2A, the positioning contact surfaces 24f formed at the first and second connecting portions 24b and 24c contact with the opening portion bottom surface 31h of the cylindrical portion 31 of the case 30, and a movement of the detecting portion 20 in the longitudinal direction is thereby restricted. Accordingly, a positioning between the case 30 and the terminal 22 is performed. More particularly, the Hall IC 21 is reliably positioned relative to the case 30.

As illustrated in FIGS. 7A-7B, the detecting portion 20 and the case 30 are disposed in the mold 40. On this occasion, each positioning portions 32e (see FIG. 8) is inserted into positioning recessed portions formed at the mold 40, and the case 30 is reliably positioned in the mold 40 on the basis of the positioning portions 32e. Then, the resin is supplied into the mold 40 to form the fix portion 10 as illustrated in FIGS. 2A-2B. On this occasion, each mold contact surface 32f of the positioning portion 32e is contacted with inner surfaces of the positioning recessed portion of the mold 40, and a movement of the case 30 in the longitudinal direction (the horizontal direction of FIG. 7A) is thereby restricted. Therefore, a position of the case 30 is not shifted caused by, for example, a handling of a work at the time of a setting of the mold, or the resin supplied into the mold 40. As well as the fix portion 10, the case 30 is made of resin and the fix portion 10 is formed in such a manner that the ring shaped protrude portion 31b formed at the cylindrical portion 31 and the fix portion 10 are welded. Accordingly, in a condition where plural rotational speed detecting sensors 1 are manufactured, a position of the fix portion 10 of each rotational speed detecting sensor 1 relative to the case 30 (a distance between a tip of the case 30 and the fix portion 10) is fixed.

With the configuration of the rotational speed detecting sensor 1 according to the embodiment of the present invention, in a condition where the case 30 is disposed in the mold 40 at the time of forming the fix portion 10, because the positioning portion 32e formed at the case 30 engages with the mold 40, the movement of the case 30 in a direction toward the opening portion side of the case 30 from a tip portion of the case 30 is prevented. Accordingly, the case 30 is prevented from sweeping away because of the resin, and the positioning of the case 30, the Hall IC 21 (i.e., the detecting member) housed in the case 30 and the fix portion 10 is restricted. Therefore, the relative positioning of the Hall IC 21 (i.e., the detecting member) and the magnetized rotor 4 (i.e., the portion to be detected) in a radial direction of the rotor (a longitudinal direction of the case 30 or the direction toward the opening portion side of the case 30 from the tip portion of the case 30) can reliably be performed. Further, by means of the mold contact surface 32f formed at both sides of the positioning portion 32e in the longitudinal direction, the movement of the case 30 relative to the mold 40 is restricted at the both sides in the longitudinal direction. Accordingly, the Hall IC 21 housed in the case 30 is reliably positioned relative to the fix portion 10, and the relative position of the Hall IC 21 and the magnetized rotor 4 becomes reliable. In consequence, the rotational speed detecting sensor 1 can achieve an optimal detecting sensitivity.

With the configuration of the rotational speed detecting sensor 1 according to the embodiment of the present invention, because the positioning portion 32e is formed at the back surface 32b, the positioning portion 32e can be formed without influencing on a thickness of the case 30 at the detecting surface 32a side. Therefore, the Hall IC 21 can be positioned closer to the magnetized rotor 4 in the radial direction of the axle 2 (see FIG. 1).

With the configuration of the rotational speed detecting sensor 1 according to the embodiment of the present invention, because the Hall IC 21 is fixed on the basis of the positioning hole 22a formed at the terminal 22, and the first connecting portion 24b and the second connecting portion 24c are formed by means of the resin molding, the positioning contact surface 24f can reliably be positioned relative to the Hall IC 21. Therefore, by contacting the positioning contact surface 24f with the opening portion bottom surface 31h of the cylindrical portion 31 of the case 30, and fixing the terminal 22 with the case 30, the relative position of the case 30 and the terminal 22 in the longitudinal direction (see FIG. 2) can reliably be defined. In other words, the Hall IC 21 can reliably be positioned relative to the case 30, and a positioning reliability of the Hall IC 21 relative to the fix portion 10 can be improved.

With the configuration of the rotational speed detecting sensor 1 according to the embodiment of the present invention, an attachment of the Hall IC 21 relative to the terminal 22, a forming of the positioning contact surface 24f, and processes thereafter can be performed on the basis of the same positioning hole 22a, by means of a production line. Accordingly, the rotational speed detecting sensor 1 with the Hall IC 21 of a higher positioning reliability relative to the magnetized rotor 4 can stably be mass-produced.

With the configuration of the rotational speed detecting sensor 1 according to the embodiment of the present invention, by press-fitting the first press-fit fix portion 24d of the first connecting portion 24b into the first guide groove 31f of the case 30, and by press-fitting the second press-fit fix portion 24e of the second connecting portion 24c into the second guide groove 31g of the case 30, the fix portion 10 can be formed in a condition where the holder 24 is fixed at the case 30. Therefore, at the time of forming the fix portion 10, a generation of a gap of a position of the Hall IC 21 relative to the fix portion 10 can be prevented, and the positioning reliability of the Hall IC 21 relative to the fix portion 10 can thereby be improved.

With the configuration of the rotational speed detecting sensor 1 according to the embodiment of the present invention, because the holder 24 of the terminal 22 includes the snap-fit structure, the wire 23 can be welded at the terminal 22 in a condition where the wire 23 is fixed at the terminal 22. Therefore, the wire 23 can be fixed at the terminal 22 without difficulty. Further, the wire 23 can be prevented from being applied with the external force at a connecting part of the core wire 23a and the connecting portion 26 during manufacturing process. Accordingly, the defects during manufacturing process can be reduced.

According to the embodiment of the present invention, the positioning portion 32e is protruded from the case 30. However, the invention is not limited thereto. Alternatively, or in addition, the positioning portion 32e may be recessed at the case 30.

According to the embodiment of the present invention, the positioning contact surface 24f is integrally formed with the holder 24. However, the invention is not limited thereto. Alternatively, or in addition, the positioning contact surface 24f and the holder 24 may be individually formed and fixed at the terminal 22. More particularly, the present invention is applicable as long as the positioning contact surface 24f and the holder 24 are positioned relative to the terminal 22 on the basis of the positioning hole 22a.

According to the embodiment of the present invention, the positioning contact surface 24f is formed at the first connecting portion 24b and the second connecting portion 24c and positioned at both sides of the detecting portion 20 in the thickness direction of the terminal 22. Therefore, a posture of the terminal 22 relative to the case 30 can be stabilized. Accordingly, a position of the terminal 22 relative to the fix portion 10, that is, the position of the Hall IC 21 relative to the fix portion 10 can reliably be defined. However, the invention is not limited thereto. The present invention is applicable as long as the positioning contact surface 24f is formed at one of the first connecting portion 24b and the second connecting portion 24c.

According to the embodiment of the present invention, the terminal 22 is fixed to the case 30 in a condition where the width of the first guide groove 31f of the case 30 is narrower than that of the first press-fit fix portion 24d to some degree, and the width of the second guide groove 31g of the case 30 is narrower than that of the second press-fit fix portion 24e to some degree. However, the invention is not limited thereto. Alternatively, or in addition, the first press-fit fix portion 24d may be protruded in the thickness direction of the terminal 22 longer than a depth of the first guide groove 31f to some degree and the second press-fit fix portion 24e may be protruded in the thickness direction of the terminal 22 longer than a depth of the second guide groove 31g to some degree. Further, alternatively, or in addition, the terminal 22 and the case 30 may be press-fitted and fixed by means of the first press-fit fix portion 24d.

According to the embodiment of the present invention, the positioning portion is recessed at or protruded from the back surface of the detecting surface of the case, which is facing the portion to be detected. With such a configuration, because the positioning portion is formed at an external surface other than the detecting surface, the positioning portion can be formed without influencing on the thickness of the case at the detecting surface side. Further, the positioning portion can be formed without influencing on the relative position of the detecting member and the portion to be detected in the radial direction of the rotor.

According to the embodiment of the present invention, in a condition where the case is disposed in the mold at the time of forming the fix portion, because the positioning portion formed at the case engages with the mold, the movement of the case caused by, for example, the handling of the work at the time of the setting of the mold, or the resin supplied into the mold is prevented. Therefore, the position of the case and the detecting member housed in the case relative to the fix portion is restricted. Accordingly, the relative positioning of the detecting member and the portion to be detected in the radial direction of the rotor can reliably be performed.

According to the embodiment of the present invention, because the detecting member is attached and the positioning contact surface is formed on the basis of the positioning hole formed at the terminal, the relative position of the detecting member and the case can reliably be defined. Therefore, the positioning reliability of the detecting member relative to the fix portion can be improved and the rotational speed detecting sensor can achieve the optimal detecting sensitivity. Further, the attachment of the detecting member relative to the terminal, the forming of the positioning contact surface, and the processes thereafter can be performed, by means of the production line, on the basis of the same positioning hole. Accordingly, the rotational speed detecting sensor with the detecting member of a higher positioning reliability can stably be mass-produced.

According to the embodiment of the present invention, the fix portion can be formed in a condition where the holder is press-fitted into the case. Therefore, the generation of a gap of the position of the case and the detecting member at the time of forming the fix portion can be prevented and the positioning reliability of the detecting member relative to the fix portion can be improved.

According to the embodiment of the present invention, because the holder includes the snap-fit structure, the wire can be connected to the terminal in a condition where the wire is fixed at the terminal. Therefore, the wire can be fixed at the terminal without difficulty. Further, the wire can be prevented from being applied with the external force in a direction in which the wire is removed from a welding portion during manufacturing process. Accordingly, the defects during manufacturing process can be reduced.

According to the embodiment of the present invention, the positioning contact surface can reliably be positioned relative to the terminal. Further, because the positioning contact surface is contacted with the case, and the fix portion is formed in a condition where the positioning portion of the case is restricted, the positioning reliability between the detecting member and the fix portion can be improved.

According to the embodiment of the present invention, because the holder includes the snap-fit structure, the wire can be connected at the terminal in a condition where the wire is fixed at the terminal. Therefore, the wire can be fixed at the terminal without difficulty. Further, the wire can be prevented from being applied with the external force in a direction in which the wire is removed from the welding portion during manufacturing process. Accordingly, the defects during manufacturing process can be reduced. Further, the holder including the snap-fit structure and the positioning portion can be formed simultaneously by means of the resin molding.

According to the embodiment of the present invention, because the fix portion is formed on the basis of the positioning portion of the case, the positioning reliability of the detecting member relative to the fix portion can be improved.

According to the embodiment of the present invention, the fix portion can be formed in a condition where the holder is press-fitted and fixed at the case, the generation of the gap of the position of the case and the detecting member at the time of forming the fix portion can be prevented and the positioning reliability of the detecting member relative to the fix portion can be improved. Further, the positioning contact surface and the press-fit fix portion can be formed simultaneously by means of the resin molding.

According to the embodiment of the present invention, the detecting member can reliably be positioned relative to the terminal, the positioning contact surface can reliably be positioned relative to the terminal, the case can reliably be positioned relative to the detecting member, and the fix portion can reliably be positioned relative to the case. Accordingly, the positioning reliability between the detecting member and the fix portion can be improved.

The principles, preferred embodiment and mode of operation of the present invention have been described in the foregoing specification. However, the invention which is intended to be protected is not to be construed as limited to the particular embodiment disclosed. Further, the embodiment described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A rotational speed detection sensor, comprising:
a detecting portion having a terminal and a detecting member attached at the terminal so as to be positioned at a tip of the detecting portion and face a magnetized portion, the detecting portion detecting variations of a magnetic flux generated by a rotation of the portion to be detected, the magnetized portion being integrally rotatable with an axle;
a fix portion fixed to an outer race of a bearing for the axle, the fix portion being formed by means of molding; and
a case, a first end of which is closed and a second end of which is opened, including
a housing portion being formed so as to recess toward the first end of the case from an opening portion side of the case, the housing portion housing the detecting member in such a manner that the detecting portion is inserted therein,
wherein the terminal includes a positioning hole, and the detecting member is attached to the terminal at a position of the positioning hole, the detecting portion includes a positioning contact surface contacting the case in a direction in which the detecting portion is inserted into the case, and a position of the positioning contact surface is determined on the basis of the position of the positioning hole, and
wherein the case includes a positioning portion for restricting the case from being moved within a mold in a direction toward the opening portion side of the case from the first end of the case and for securing a position of the fix portion to be formed within the mold.

2. The rotational speed detection sensor according to claim 1, wherein
the case further includes a cylindrical portion formed in a hollow and cylindrical shape,
the cylindrical portion includes an opening portion at a first side thereof, and
the positioning contact surface of the detecting portion contacts an opening bottom surface of the cylindrical portion.

3. The rotational speed detection sensor according to claim 2,
wherein the detecting portion includes a holder holding a wire that transmits a signal of the detecting member, and
wherein the holder is formed in a snap-fit structure for fixing the wire relative to the detecting portion.

4. The rotational speed detection sensor according to claim 2, wherein
the case includes a cylindrical portion and a terminal housing portion extending from a bottom portion of the cylindrical portion,
the bottom portion of the cylindrical portion and the positioning contact surface of the detecting portion contact each other, and
the detecting portion includes a press-fit fix portion to be press-fitted into and fixed at a guide groove formed at the cylindrical portion.

5. The rotational speed detection sensor according to claim 1, wherein the detecting portion includes a press-fit fix portion configured to fix the detecting portion at the ease by press-fitting the press-fit fix portion into a guide groove.

6. The rotational speed detection sensor according to claim 1,
wherein the detecting portion includes a holder holding a wire that transmits a signal of the detecting member, and
wherein the holder is formed in a snap-fit structure for fixing the wire relative to the detecting portion.

7. The rotational speed detection sensor according to claim 1,
wherein the detecting portion includes a resin portion integrally formed by means of molding, the resin portion being attached to the terminal after the detecting member is attached to the terminal, and
wherein the resin portion includes the positioning contact surface.

8. The rotational speed detection sensor according to claim 7,
wherein the resin portion includes a holder holding a wire that transmits a signal of the detecting member, and
wherein the holder is formed in a snap-fit structure for fixing the wire relative to the detecting portion.

9. The rotational speed detection sensor according to claim 1, wherein the fix portion is formed by means of resin molding on the basis of a position of the positioning portion of the case.

* * * * *